United States Patent
Eberle et al.

(10) Patent No.: US 8,865,004 B2
(45) Date of Patent: Oct. 21, 2014

(54) DEVICE FOR PURIFYING WATER

(75) Inventors: Richard Eberle, Ormesheim (DE); Micha Kreibig, Rehlingen-Siersburg (DE); Markus Dewes, Oberthal (DE)

(73) Assignee: Hydac Filtertechnik GmbH, Sulzbach/Saär (DE)

( * ) Notice: Subject to any disclaimer, the term of this patent is extended or adjusted under 35 U.S.C. 154(b) by 185 days.

(21) Appl. No.: 13/138,960

(22) PCT Filed: Apr. 23, 2010

(86) PCT No.: PCT/EP2010/002502
§ 371 (c)(1),
(2), (4) Date: Nov. 18, 2011

(87) PCT Pub. No.: WO2010/127774
PCT Pub. Date: Nov. 11, 2010

(65) Prior Publication Data
US 2012/0080368 A1    Apr. 5, 2012

(30) Foreign Application Priority Data

May 2, 2009   (DE) .................. 10 2009 019 800

(51) Int. Cl.
| | | |
|---|---|---|
| *C02F 1/461* | (2006.01) | |
| *F02M 37/22* | (2006.01) | |
| *B01D 36/00* | (2006.01) | |
| *C02F 1/467* | (2006.01) | |

(52) U.S. Cl.
CPC ........ *F02M 37/221* (2013.01); *C02F 2305/023* (2013.01); *C02F 1/4672* (2013.01); *C02F 2201/4613* (2013.01); *C02F 2201/3222* (2013.01); *C02F 2305/10* (2013.01); *B01D 36/008* (2013.01)
USPC .................... 210/748.17; 210/192; 210/416.4

(58) Field of Classification Search
CPC ............ B01D 36/008; C02F 2305/023; C02F 1/4672; C02F 2201/4613; C02F 2201/3222; C02F 2305/10; F02M 37/221
USPC ...................... 210/748.01, 748.17, 192, 416.4
See application file for complete search history.

(56) References Cited

U.S. PATENT DOCUMENTS

| | | | | |
|---|---|---|---|---|
| 5,419,824 A | * | 5/1995 | Weres et al. .................. | 204/268 |
| 6,315,886 B1 | * | 11/2001 | Zappi et al. .................. | 205/701 |
| 6,547,951 B1 | * | 4/2003 | Maekawa ...................... | 205/688 |

(Continued)

FOREIGN PATENT DOCUMENTS

| | | |
|---|---|---|
| DE | 103 50 781 | 7/2004 |
| DE | 10 2004 029 874 | 9/2005 |

(Continued)

OTHER PUBLICATIONS

Machine-generated English translation of DE 102004029874. Printed on Sep. 22, 2013.*

*Primary Examiner* — Fred Prince
(74) *Attorney, Agent, or Firm* — Roylance, Abrams, Berdo and Goodman LLP

(57) ABSTRACT

The invention relates to a device for purifying water contaminated with organic substances, which is drained or collected from filters, especially fuel filters or elements of a fuel system. Hydroxyl radicals are formed from the water by means of a separating device where the hydroxyl radicals oxidize the impurities, especially organic substances, as much as possible, and convert them into compounds such as $CO_2$.

12 Claims, 2 Drawing Sheets

(56) References Cited

U.S. PATENT DOCUMENTS

| | | | |
|---|---|---|---|
| 6,722,324 B2* | 4/2004 | Kato et al. | 123/73 AD |
| 6,764,598 B2* | 7/2004 | Yu et al. | 210/195.2 |
| 7,294,270 B2* | 11/2007 | Miyazaki et al. | 210/610 |
| 2003/0226810 A1* | 12/2003 | Furuta et al. | 210/748 |
| 2004/0031761 A1* | 2/2004 | Wunsche et al. | 210/748 |
| 2004/0226881 A1* | 11/2004 | Miyazaki et al. | 210/615 |
| 2008/0006584 A1* | 1/2008 | Van Vliet et al. | 210/748 |
| 2009/0001027 A1 | 1/2009 | Carew | |

FOREIGN PATENT DOCUMENTS

| | | |
|---|---|---|
| DE | 10 2008 022 406 | 11/2009 |
| EP | 0 365 615 | 6/1994 |
| EP | 1 581 736 | 8/2007 |
| WO | WO 2004/065780 | 8/2004 |
| WO | WO 2006/061192 | 6/2006 |
| WO | WO 2009/135489 | 11/2009 |

\* cited by examiner

DEVICE FOR PURIFYING WATER

FIELD OF THE INVENTION

The present invention relates to a device for purifying water drained or collected from filters, especially fuel filters or elements of the fuel system, where the water is contaminated with organic matter.

BACKGROUND OF THE INVENTION

In order to ensure the operational reliability of drive units, such as in particular internal combustion engines, which are supplied with liquid fuels, it is conventional practice to provide fuel supply systems with water-separating fuel filters. The separation of water which is contained or entrained fuel and in particular in diesel fuel is required to protect the sensitive injection system from damage. The water which has been separated in these systems is loaded with various types of organic matter, for example, with suspended droplets of oil from the diesel fuel flowing through the fuel filter. Therefore, for reasons of environmental protection, the release of water which has been separated from the fuel filter systems into the environment without further treatment is not an option.

SUMMARY OF THE INVENTION

Accordingly, one object of the present invention is to provide a device for purifying water which has been separated from a fuel supply systems, where the device, can be easily and economically operated, and enables effective removal of the organic loads so that the purified water can be released into the environment quite safely.

Accordingly, the important feature of the is the device having a separating means by which hydroxyl radicals can be separated from the water to be purified, so that said hydroxyl radicals oxidize the organic matter contained in the water as much as possible into inorganic compounds such as $CO_2$. Since hydroxyl radicals are chemically highly reactive, they are able to develop such a high oxidation potential that organic loads such as, for example, oil-water emulsions or suspended diesel droplets in the water which has been separated from diesel fuel filters are oxidized almost completely into $CO_2$.

In especially advantageous exemplary embodiments, the separating means has an electrolysis apparatus and/or hydroxyl radical-forming media, for example, catalysts such as titanium dioxide.

When the hydroxyl radicals are produced by splitting water by means of electrolysis, the configuration can be made especially advantageously such that the electrolysis apparatus has at least one diamond electrode which is anodically active during electrolysis. Water decomposition can be achieved by means of a diamond electrode which is electrically conductive by doping with the element boron. While water is typically split into hydrogen and oxygen during electrolysis, the diamond electrode provides a working range in which highly reactive hydroxyl radicals are formed instead of oxygen and hydrogen.

In advantageous exemplary embodiments, the electrolysis apparatus can have two diamond electrodes which, when energized with polarity reversal, the electrodes function alternately as an anode and as a cathode. This device with two diamond electrodes can be operated, with alternating current.

If alternatively a diamond electrode is acting as anode for the electrolysis, a high-grade steel electrode is preferably used as the cathode. The steel electrode is subjected to cathodic protection during electrolysis according to the method of electrochemical protection, as is used for corrosion protection, for example, in tanks or ships.

Preferably, the arrangement is made such that the device has a treatment chamber downstream of the pertinent fuel filter for the water which is to be purified. The chamber has a controllable outlet or conveyor device or overflow for the purified water as well as the separating means in order to make contact between the water in the treatment chamber and the hydroxyl radicals which have been formed in the chamber.

As an alternative to the arrangement of the electrolyzing electrodes, the separation means can have a body which is located in the treatment chamber and in contact with the water. The body contains or is coated with titanium dioxide and forms the hydroxyl radicals when in contact with the water.

In especially advantageous exemplary embodiments, it is furthermore provided that the separating means, preferably in addition to the part of the means which produces hydroxyl radicals and which is located in the treatment chamber, has a filter medium which is provided with titanium dioxide for the formation of hydroxyl radicals in the associated fuel filter.

To promote the formation of hydroxyl radicals by titanium dioxide, the separating means can have a means for supplying radiant energy. For this purpose, there can be an artificial or natural light source, preferably with wavelengths from 180 to 300 nm.

Depending on where the formation of the hydroxyl radicals by titanium dioxide takes place, a radiation source of this type can be provided for irradiation of the treatment chamber and/or of the interior of the fuel filter.

Other objects, advantages and salient features of the invention will become apparent from the following detailed description, which, taken in conjunction with the drawings, discloses various embodiments of the invention.

BRIEF DESCRIPTION OF THE DRAWINGS

The following is a brief description of the drawings in which.

DETAILED DESCRIPTION OF THE INVENTION

Figure 1:
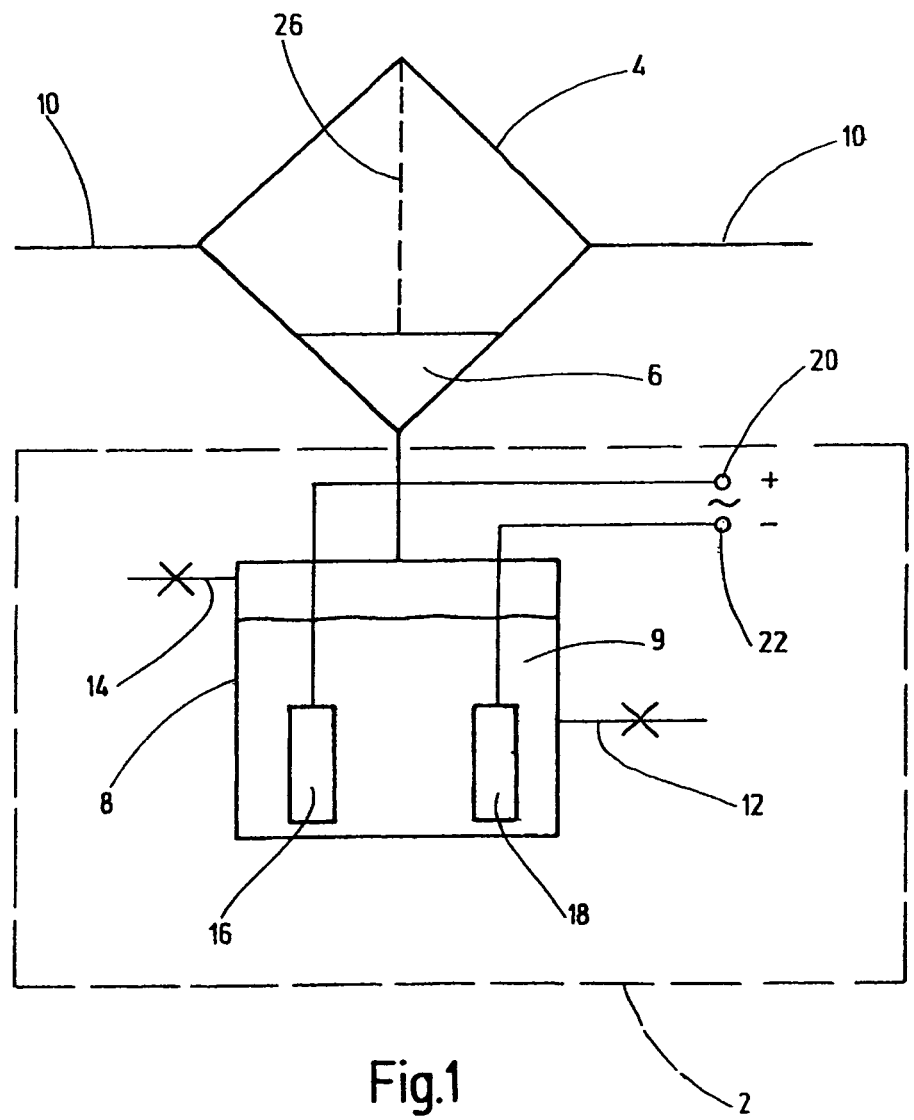
FIG. 1 is a schematic diagram of one exemplary embodiment of the device according to the invention.

The invention is explained below using examples in which the purification device 2 is integrated into the fuel supply system such that water 6 which has been removed from a water-separating fuel filter 4 is drained directly into a tank 8 of the device 2, which tank forms a treatment chamber. Alternatively, the purification device 2 can also form a unit which is separate from a fuel supply system and in which captured water is purified.

In the examples described here, the fuel filter 4 is located in the route of the fuel line 10, and fuel, for example, diesel fuel, flows through the filer before it is delivered to a system to be supplied (not shown), for example, the injection pump of a diesel engine. The water 6 which has been separated in the filter 4 is drained directly into the tank 8 of the device 2. The tank 8 forms a treatment chamber for the drained water 9 with a controllable drain 12 and a controllable outlet 14 by means of which a feed amount of water 9 to be purified for a specified treatment interval is maintained using level sensor means which are conventional in the art and where the water is released after the purification is completed.

Figure 2:
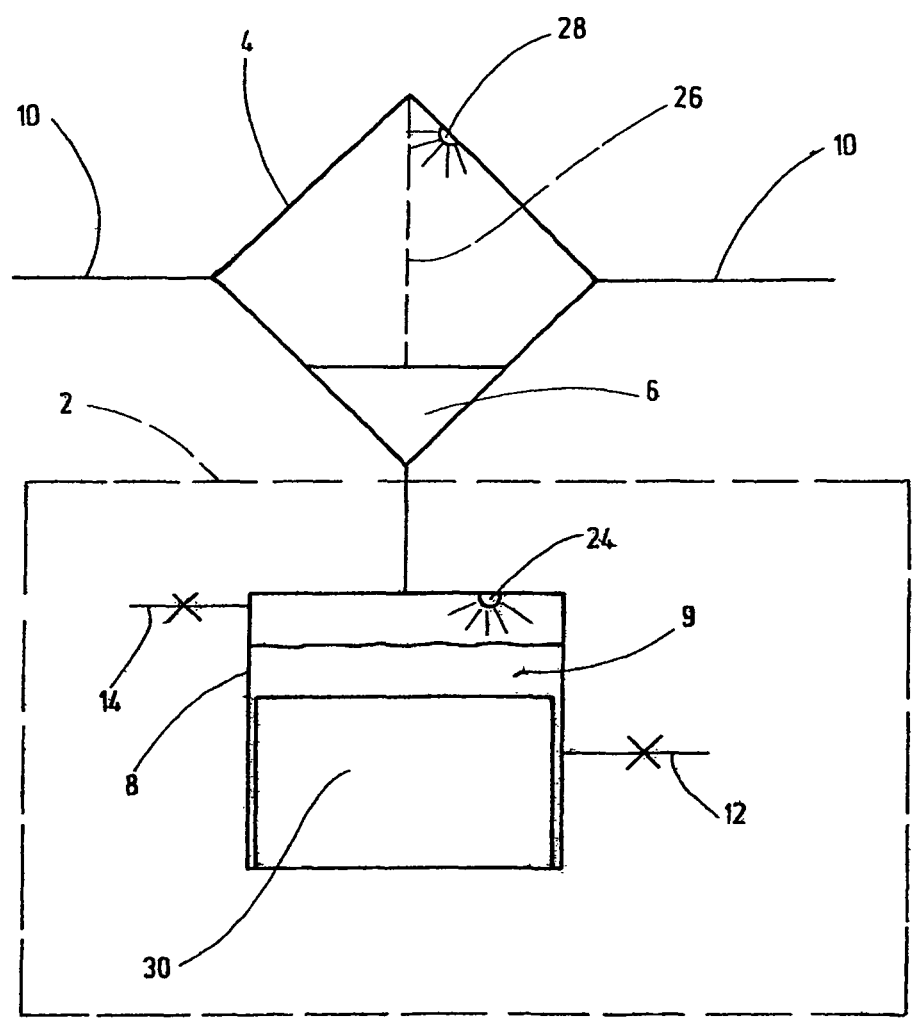
FIG. 2 is a schematic diagram of a second exemplary embodiment of the device corresponding to FIG. 1.

In the two exemplary embodiments of FIG. 1 and FIG. 2, the water 6, 9 originating from the fuel filter is purified by the oxidation of organic loads by bringing these loads into contact with highly reactive hydroxyl radicals in the tank 8, which is used as a treatment chamber. In the two exemplary embodiments, the hydroxyl radicals are split off from the water molecules in the tank 8, using a separating means. In the exemplary embodiment of FIG. 1, water decomposition takes place by electrolysis, which is carried out by means of two diamond electrodes 16 and 18. While water typically is split into hydrogen and oxygen during electrolysis, a diamond electrode 16, 18 yields a working range in which highly aggressive hydroxyl radicals are formed instead of oxygen.

The diamond electrodes 16, 18 can be formed such that a crystalline diamond layer of only few microns thick obtained from hydrogen gas and a hydrocarbon gas such as methane is applied to a conductive substrate at very high temperatures between 2000° C. and 3000° C., rendering the diamond layer electrically conductive by doping with the element boron.

If, as in the exemplary embodiment of FIG. 1, the two electrodes 16 and 18 are diamond electrodes, electrolysis can take place by applying an AC voltage whereby, corresponding to polarity reversal, one electrode 16 or 18 at a time acts as an anode and the other electrode 16 or 18 as a cathode. Alternatively, the arrangement can be made such that only one of the electrodes—in the example shown in FIG. 1, the electrode 16—is a diamond electrode and is connected to the positive terminal 20 of a DC voltage source. In this case, the electrode 18, which is connected to the negative terminal 22 and which is acting as cathode, is a high-grade steel electrode. In operation, a cathodic protection occurs for the electrode 18 acting as cathode, corresponding to conventional methods of electrochemical protection for corrosion protection of tanks or ships.

In any event, the high oxidation potential of the hydroxyl radicals which have been formed ensures that the organic substances found in the water are oxidized into harmless inorganic compounds, especially into $CO_2$ which escapes from the tank 8. The purified water can then be safely released into the environment.

FIG. 2 shows one example in which a chemical separating means is used instead of a separating means made as an electrolysis apparatus, specifically such that a titanium dioxide-containing body 30 located in the tank 8 is brought into contact with the water 9 to be purified. Making contact with titanium dioxide results in the splitting of hydroxyl radicals from the pertinent water 9. As has been found, this chemical mechanism can be enhanced by a supply of radiant energy. The supply of radiant energy can take place by an artificial or natural light source 24 which irradiates the contents of the tank within the tank 8. A wavelength range from 180 to 300 nm has proven especially effective. The light source 24 can be sunlight, lights such as LEDs, or the like.

In the two exemplary embodiments of FIG. 1 and FIG. 2, it can also be provided that the fuel filter 4 is provided with a filter medium 26 which has a coating with titanium dioxide so that a separating means for splitting off hydroxyl radicals from the water 6 is already formed in the fuel filter 4. The resulting purification can replace the water purification in the tank 8 or in addition thereto can be provided as a preliminary purification. As in the separating means within the tank 8, there can also be an arrangement for the supply of radiant energy as a reaction enhancement means for the separating means formed in the fuel filter 4, in this example another light source 28.

The invention enables effective purification with a device which is simple to operate and which does not require any consumable materials, but simply requires a supply of electrical energy for electrolysis or optionally for radiation sources in the form of light sources 24, 28.

While various embodiments have been chosen to illustrate the invention, it will be understood that various changes and modifications can be made therein without departing from the scope of the invention as defined in the appended claims.

What is claimed is:

1. A purifying device for treating contaminated water separated from a hydrocarbon fuel, said device comprising:
    a hydrocarbon fuel filter having a fuel inlet, a fuel outlet, a filter medium and an outlet for removing and separating contaminated water from said fuel;
    a treatment chamber connected to said fuel filter and containing the contaminated water separated from the hydrocarbon fuel; and
    two diamond electrodes in said treatment chamber in contact with the contaminated water, said electrodes connected to an AC electrical power source to energize each of said diamond electrodes to alternate as an anode and as a cathode to generate hydroxyl radicals at each of said diamond electrodes in the contaminated water and oxidize contaminants in the contaminated water into carbon dioxide.

2. The device of claim 1, wherein
   said treatment chamber is downstream of said fuel filter, and
   said treatment chamber further comprises an outlet with a control device for removing purified water from said treatment chamber and a water level sensor for maintaining contact between said diamond electrodes and the contaminated water to generate hydroxyl radicals.

3. The device of claim 2, wherein
   a body containing or coated with titanium dioxide generating hydroxyl radicals is in contact with the contaminated water.

4. The device of claim 2, wherein
   said fuel filter has a filter medium comprising titanium dioxide for forming hydroxyl radicals from contaminated water in said fuel filter.

5. The device of claim 4, wherein
   a radiant energy source is in said fuel filter.

6. The device of claim 1, wherein
   a radiant energy source is in said treatment chamber.

7. The purifying device of claim 1, wherein
   said contaminated water is contaminated with the hydrocarbon fuel.

8. A purifying device comprising;
    a fuel filter for separating water from a hydrocarbon fuel, said fuel filter having a fuel inlet, a filter medium containing or coated with titanium dioxide for producing hydroxyl radicals from the water separated from the hydrocarbon fuel in said fuel filter, a fuel outlet, and a water outlet for removing contaminated water separated from the hydrocarbon fuel;
    a treatment chamber connected to said water outlet of said fuel filter and containing the contaminated water directly from said fuel filter, said treatment chamber having two diamond electrodes in contact with the contaminated water; and
    an AC supply connected to each of said diamond electrodes for supplying alternating current to said diamond electrodes to operate each of said electrodes alternately as an anode and as a cathode to generate hydroxyl radicals in said treatment chamber from contaminated water separated from the hydrocarbon fuel in an amount to oxidize contaminants in said contaminated water into carbon dioxide.

9. The purifying device of claim 8, further comprising a radiant energy source in said fuel filter to promote the formation of hydroxyl radicals by the titanium dioxide coated filter medium.

10. The purifying device of claim 9, further comprising a level sensor in said treatment chamber to retain the contaminated water in said treatment chamber for a predetermined amount of time to treat the contaminated water.

11. The purifying device of claim 8, wherein said contaminated water is contaminated with the hydrocarbon fuel.

12. A method of treating contaminated water comprising the steps of:
   supplying a hydrocarbon fuel to a fuel filter and separating contaminated water containing hydrocarbon fuel contaminants from said hydrocarbon fuel, the fuel filter having a fuel inlet, a filter medium containing or coated with titanium dioxide and a fuel outlet;
   producing hydroxyl radicals in said fuel filter from the contaminated water separated from said hydrocarbon fuel;
   directing said contaminated water from said fuel filter to a treatment chamber and treating said contaminated water containing hydrocarbon contaminants, said treatment chamber having two diamond electrodes in contact with said contaminated water; and
   supplying an AC current to each of said diamond electrodes to operate each of said diamond electrodes as an anode and a cathode and generating hydroxyl radicals from said contaminated water in the treatment chamber and oxidizing hydrocarbon contaminants in the contaminated water into carbon dioxide.

* * * * *